United States Patent
El Semary

(10) Patent No.: US 11,845,859 B1
(45) Date of Patent: Dec. 19, 2023

(54) BIOPOLYMER DERIVED FROM ALGAE

(71) Applicant: KING FAISAL UNIVERSITY, Al-Ahsa (SA)

(72) Inventor: Nermin Adel El Semary, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/127,218

(22) Filed: Mar. 28, 2023

(51) Int. Cl.
*C08L 5/00* (2006.01)
*C08L 5/04* (2006.01)
*C08L 1/02* (2006.01)

(52) U.S. Cl.
CPC ........ *C08L 5/00* (2013.01); *C08L 1/02* (2013.01); *C08L 5/04* (2013.01); *C08L 2201/06* (2013.01)

(58) Field of Classification Search
None
See application file for complete search history.

(56) References Cited

U.S. PATENT DOCUMENTS

| | | | |
|---|---|---|---|
| 4,078,331 A | 3/1978 | Savins et al. | |
| 2010/0316739 A1 | 12/2010 | Nisis | |
| 2013/0344550 A1* | 12/2013 | Miller | C12P 7/625 435/253.6 |

FOREIGN PATENT DOCUMENTS

| | | | | |
|---|---|---|---|---|
| CA | 2637269 A | | 8/2007 | |
| CN | 113549236 A | * | 10/2021 | |
| FR | 3096892 A1 | * | 12/2020 | ............. A23K 10/30 |
| WO | WO-2012054003 A1 | * | 4/2012 | ............. C08L 23/02 |

OTHER PUBLICATIONS

WO-2012054003-A1, English translation (Year: 2012).*
FR-3096892-A1—English translation (Year: 2020).*
Zayed et al, Sulfated Galactofucans: An Outstanding Class of Fucoidans with Promising Bioactivies, Mar. Drugs. 20, 412 (Year: 2020).*
Li et al, Brown Algae Carbohydrates: Structures, Pharmaceutical Properties and Research Challenges, Mar. Drugs, 19, 620 (Year: 2021).*
CN-113549236-A, English translation (Year: 2021).*
Palanisamy, et al.; "Biopolymer Technologies for Environmental Applications"; Nanoscience and Biotechnology for Environmental Applications; Kumaraguru College of Technology; ECSW vol. 22 (2019).
Kora, et al.; "Catalytic Degradation of Anthropogenic Dye Pollutants Using Palladium Nanoparticles Synthesized by Gum Olibanum, a Glucuronoarabinogalactan Biopolymer"; Industrial Crops and Products 81: pp. 1-10 (2016); National Centre for Compositional Characterisation of Materials (NCCCM), Bhabha Atomic Research Centre.

* cited by examiner

*Primary Examiner* — Stefanie J Cohen
(74) *Attorney, Agent, or Firm* — Nath, Goldberg & Meyer; Richard C. Litman

(57) ABSTRACT

The present processes are used to convert brown algae into a moldable biopolymer, Specifically, the present processes use a brown algae such as *Hormophysa cuneiformis* combined with *Boswellia Carterii* to obtain the moldable biopolymer. Once obtained, the moldable biopolymer can form a composite with other environmentally friendly materials to obtain eco-friendly products, such as a biodegradable and sustainable container.

9 Claims, No Drawings

BIOPOLYMER DERIVED FROM ALGAE

BACKGROUND

1. Field

The disclosure of the present patent application relates to biopolymers derived from algae, and particularly to biopolymers derived from brown algae.

2. Description of the Related Art

Polymers are used in many industries. Traditional chemical polymers are non-biodegradable and they pollute our environment, unlike biopolymers that are biodegradable and maintain environmental sustainability. Production from non-renewable resources and their resistance to biodegradation are issues that deter us from relying on conventional petrochemical-based polymers. In this context, biopolymers derived from natural sources are emerging as sustainable and safe alternatives. Biopolymers are increasingly relied upon for their pro-environment aspects. However, much more work needs to be done to develop suitable biopolymers that can he used as complete chemical polymer replacements.

Therefore, researchers have recently focused on novel and potentially eco-friendly control tools. Algae are a group of photosynthetic organisms which inhabit a wide range of environments and are plentifully available. The development of biopolymers produced from algae represent a potentially safe, applicable, and low-cost alternatives for chemical polymers, which negatively affect the environment and health.

Thus, new biopolymers derived from algae solving the aforementioned are desired.

SUMMARY

In certain embodiments, the present subject matter relates to new biopolymers derived from algae, particularly brown algae, processes for obtaining the same, and eco-friendly containers implementing the same.

In one embodiment, the present subject matter elates to a process for preparing a moldable biopolymer, the process comprising: mixing a ground powder of a brown algae with ground *Boswellia Carterii* in a solvent to obtain a mixture; heating the mixture to obtain a heated mixture; homogenizing the heated mixture to obtain a homogenized mixture; and forming the moldable biopolymer In another embodiment, the present subject matter relates to a moldable biopolymer produced according to the process described herein.

In a further embodiment, the present subject matter relates to a composition comprising a composite of the moldable biopolymer described herein and one or more additional components selected from the group consisting of glycerin, polyethylene glycol, one or more natural plant materials, and combinations thereof. In other embodiments, the present subject matter relates to an environmentally neutral container comprising this composition.

These and other features of the present subject matter will become readily apparent upon further review of the following specification.

DETAILED DESCRIPTION OF THE PREFERRED EMBODIMENTS

The following definitions are provided for the purpose of understanding the present subject matter and for construing the appended patent claims.

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from nominal value unless otherwise indicated or inferred.

The term optional or "optionally" means that the subsequently described event or circumstance may or nay not occur, and that the description includes instances where said event or circumstance occurs and instances in which it does not.

Unless defined otherwise, all technical and scientific terms used herein have the same meaning as commonly understood to one of ordinary skill in the art to which the presently described subject latter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alters alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

In one embodiment, the present subject matter elates to a process for preparing a moldable biopolymer, the process comprising: mixing a ground powder of a brown algae with ground Boswellia Carterii in a solvent to obtain a mixture; heating the mixture to obtain a heated mixture; homogenizing the heated mixture to obtain a homogenized mixture; and forming the moldable biopolymer.

In one embodiment, the brown algae used in the present process is *Hormophysa cuneiformis*. In another embodiment in this regard, the *Hormophysa cuneiformis* and the *Boswellia Carterii* are mixed in an about 1:1 ratio, by weight.

In further embodiments, the brown algae used in the process can comprise one or more fucoidans, one or more polysaccharides, a crystalline component, and mannitol. In this regard, the one or more fucoidans can be galactofucoidans selected from the group consisting of sugars, uronate, sulfate, and combinations thereof. Similarly, the one or more polysaccharides can be selected from the group consisting of alginate, laminarin, and combinations thereof, while the crystalline component can be cellulose.

In certain embodiments, the solvent used to obtain the mixture can be water. In further embodiments, the mixture can be heated at a temperature of about 95° C. to about 105° C., about 95° C., about 96° C., about 97° C., about 98° C., about 99° C., about 100° C., about 101°C., about 102° C. about 103° C., about 104° C., or about 105° C. In one embodiment in this regard, the mixture can be heated at a temperature of about 100° C. In this regard, the heating step can be conducted by a normal heating process or by autoclaving the mixture.

In a further embodiment, the heated mixture can be homogenized with water.

In certain embodiments, the present subject matter relates to a moldable biopolymer prepared by the processes described herein. In this regard, the *Hormophysa cuneiformis* is known as a brown algae. As such, it is expected that the *Hormophysa cuneiformis* based. biopolymer as prepared herein will include components including, by way of non-limiting example, one or more fucoidans that can be galactofucoidans selected from the group consisting of sugars, uronate, sulfate, and combinations thereof; one or more polysaccharides selected from the group consisting of alginate, laminarin, and combinations thereof; a crystalline component that can be cellulose; and mannitol.

In further embodiments in this regard, the concentration of each of these bioactive compounds in the produced algae extract can vary according to the age of the algae, metabolic activity, and ecological adaptation.

In additional embodiments, the components and quality of the biopolymer can vary and be adjusted according to the desired purpose of use of the biopolymer. The biopolymer can be prepared as a thick or thin biomaterial according to the specification intended use. What is most important, regardless of the use of the biopolymer, is that the about 1:1 weight ratio of the *Hormophysa cuneiformis* and the *Boswellia Carterii* be maintained; the actual amounts or concentrations of each component can be adjusted according to the desired use of the biopolymer.

In one embodiment, the present subject matter further relates to a composition comprising a composite of the moldable biopolymer as described herein and one or more additional components selected from the group consisting of glycerin, polyethylene glycol, one or more natural plant materials, and combinations thereof. In this regard, by way of non-limiting example, the one or more natural plant materials can be myrrh, as well as any other suitable plant material. The thus produced composition can be moldable and easily shaped.

In further embodiments, the present subject matter relates to an environmentally neutral container comprising the herein described composition, As such, the container can be biodegradable and maintain environmental sustainability

EXAMPLES

Example 1

6 gm of ground dried brown algae *Hormophysa cuneiformis* is mixed with 6 gm of ground *Boswellia Carterii* in 75 ml water. The mixture is then autoclaved or heated at 100° C. The mixture after this is homogenized with 25 ml water and left to form a biopolymer that is moldable and can be used in various applications.

It is to be understood that the biopolymers are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A process for preparing a moldable biopolymer, the process comprising:
   mixing a ground powder of a brown algae with ground *Boswellia Carterii* in a solvent to obtain a mixture;
   heating the mixture to obtain a heated mixture;
   homogenizing the heated mixture to obtain a homogenized mixture; and
   forming the moldable biopolymer, wherein the brown algae is *Hormophysa cuneiformis* and the *Hormophysa cuneiformis* and the *Boswellia Carterii* are mixed in a 1:1 ratio, by weight.

2. The process as recited in claim 1, wherein the brown algae comprises one or more fucoidans, one or more polysaccharides, a crystalline component, and mannitol.

3. The process as recited in claim 2, wherein the one or more fucoidans are galactofucoidans selected from the group consisting of sugars, uronate, sulfate, and combinations thereof.

4. The process as recited in claim 2, wherein the one or more polysaccharides are selected from the group consisting of alginate, laminarin, and combinations thereof.

5. The process as recited in claim 2, wherein the crystalline component is cellulose.

6. The process as recited in claim 1, wherein the solvent is water.

7. The process as recited in claim 1, wherein the mixture is heated at a temperature of 100° C.

8. The process as recited in claim 1, wherein the heating step is conducted by autoclaving the mixture.

9. The process as recited in claim 1, wherein the heated mixture is homogenized with water.

* * * * *